FEP-FLUOROCARBON TUBING

Original Filed April 13, 1965

INVENTORS
Berlen E. Ely, Jr.
John W. Burley
Ira T. Clement
Morgan, Finnegan, Durham & Pine
ATTORNEYS United States Patent Office Re. 27,028
Reissued Jan. 12, 1971

27,028

FEP-FLUOROCARBON TUBING

Berten E. Ely, Jr., Cheney, John W. Burley, Ardmore, and Ira T. Clement, Glen Mills, Pa., assignors to Penntube Plastics Company, a corporation of Delaware Original No. 3,265,092, dated Aug. 9, 1966, Ser. No. 447,844, Apr. 13, 1965, which is a continuation-in-part of Ser. No. 372,602, June 4, 1964, now Patent No. 3,196,194. Application for reissue Nov. 12, 1969, Ser. No. 876,017

Int. Cl. F16l *11/00, 9/14;* B44d *1/34;* B27j *5/00;* B29c *17/06, 17/07, 23/00*

U.S. Cl. 138—118 11 Claims

Matter enclosed in heavy brackets [ ] appears in the original patent but forms no part of this reissue specification; matter printed in italics indicates the additions made by reissue.

ABSTRACT OF THE DISCLOSURE

*This invention relates to heat shrinkable tubing of a copolymer of tetrafluoroethylene and hexafluoropropylene having specified ratios of expanded diameter to recovered diameter.*

The present application is a continuation-in-part of our copending application Serial No. 372,602, filed June 4, 1964 now U.S. Patent No. 3,196,194, for FEP-fluorocarbon Tubing and Process, which is in turn a continuation-in-part of our copending application Serial No. 68,915, filed November 14, 1960 now abandoned, for Fuorinated Hydrocarbon Tubing and Process. The present case contains subject matter taken from Serial No. 372,602.

The present invention relates to heat shrinkable tubing of a copolymer of tetrafluoroethylene and 5 to 35% by weight of hexafluoropropylene.

The copolymer of tetrafluoroethylene and 5 to 35% by weight of hexafluoropropylene is commonly referred to as FEP-fluorocarbon and is referred to specifically in this way in ASTM tentative specification D2116–62T for FEP-Fluorocarbon Molding and Extrusion Materials. The most common embodiment of this material is a copolymer of tetrafluoroethylene and 15% of hexafluoropropylene. Throughout this specification these materials will be designated as FEP-fluorocarbon for convenience.

A purpose of the invention is to produce higher shrinkage ratios of heat shrinkable FEP-fluorocarbon tubing.

A further purpose is to obtain reliable shrinkage of FEP-fluorocarbon tubing.

A further purpose is to obtain a heat shrinkable fluorocarbon tubing which can be shrunk at lower temperatures.

A further purpose is to make FEP-fluorocarbon tubing heat shrinkable without the necessity for irradiation.

A further purpose is to obtain a fluorocarbon heat shrinkable tubing which can be heat sealed.

A further purpose is to obtain a heat shrinkable transparent fluorocarbon tubing.

A further purpose is to produce at lower cost a heat shrinkable tubing which can withstand temperatures up to 400° F. for extended periods of time.

A further purpose is to obtain at lower cost a heat shrinkable tubing which has the desirable fire resistance, chemical resistance and electrical insulation properties of a fluorocarbon.

A further purpose is to produce FEP-fluorocarbon tubing in the range of wall thickness between 0.005 and 0.060 inch.

A further purpose is to produce FEP-fluorocarbon tubing in indefinite lengths.

A further purpose is to produce FEP-fluorocarbon tubing in small ranges of expansion which can be shrunk on interior structure to make scuff jackets, hose covering, wire covering and roll covering.

Further purposes appear in the specification and in the claims.

In the drawings we have chosen to illustrate one only of the numerous techniques for producing heat shrinkable tubing according to the invention, choosing the forms shown from the standpoints of convenience in illustration, satisfactory operation and clear demonstration of the principles involved.

Figure 1:
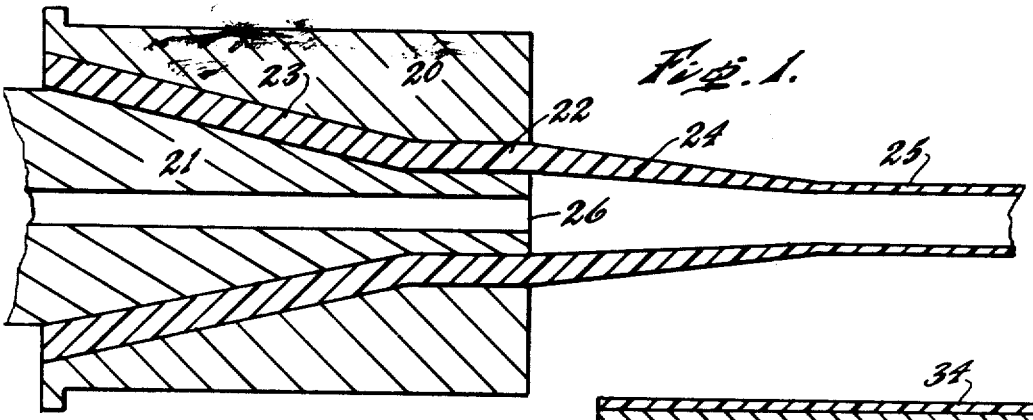
FIGURE 1 is a diagrammatic central vertical axial section of an extrusion die for extruding FEP-fluorocarbon tubing according to the invention.

Describing in illustration but not in limitation and referring to the drawings:

Tetrafluoroethylene can be produced in the form of heat shrinkable tubing. This material can be expanded and cooled and when reheated will shrink. See Australian Patent 225,619, Canadian Patent 484,849 and U.S. Patent 2,983,961.

There are certain features of tetrafluoroethylene expanded tubing which tend to limit its usefulness. It is costly because it cannot be melt exteruded, being produced by paste extrusion.

It cannot be heat sealed. It is not transparent. The temperature of shrinkage of tetrafluoroethylene tubing is so high that many materials on which it would be desirable to shrink it would be destroyed or damaged at the high temperature, such as certain other plastics or wood.

Efforts have been made to expand true thermoplastic plastics which can be melt extruded by heating tubing of such plastics and introducing gas under pressure to the heated tubing in the manner in which tetrafluoroethylene can be expanded. These efforts have led in most cases to complete failure. When efforts have been made to apply this technique to monochlorotrifluoroethylene tubing (Kel-F) the tubing heated for expansion simply bursts by blowing holes in it and no heat shrinkable tubing can be produced. The same difficulties have been encountered in attempting to expand by this technique polyvinylidenefluoride tubing, polycarbonate tubing, polyethylene tubing and polypropylene tubing.

In the case of FEP-fluorocarbon tubing, as commercially produced, it was found that very limited expansions could be obtained, of the order of 15 or 20% of the initial internal diameter, and much of the tubing would not expand without blowing holes.

Recognition has existed in the prior art of the difficulties in producing heat shrinkable tubing of such thermoplastic materials as polyolefin, and these materials have been irradiated so as to crosslink them sufficiently so that heat shrinkable materials can be reliably produced. This has the disadvantage, however, that it renders the materials incapable of heat sealing and it adds considerably to the cost and time consumed in producing heat shrinkable tubing. Also, so far as we are aware, no one has produced heat shrinkable tubing by irradiating FEP-fluorocarbon tubing.

We have discovered that FEP-fluorocarbon tubing can be rendered heat shrinkable and many advantages can be obtained if the melt extrusion technique is changed from current commercial practice and the heat expanding temperature is controlled.

By this technique we find that FEP-fluorocarbon will reliably produce heat shrinkabe tubing of much greater heat shrinkage, being capable of expanding not merely 15 or 20%, but in the range of 33 to 100% of the initial internal diameter, and correspondingly heat shrinking. We find that very reliable commercial practice can produce heat expanded FEP-fluorocarbon tubing in the expansion range of 33 to 50%, and that greater expansions up to 100% can be obtained if special care is taken and the producer is willing to accept a lower yield. Thus in the present invention expansion ratios of 1.21 to 2.0 or preferably 1.33 to 2.0 are obtained.

We furthermore find that in the expanding range from 33 to 50% a very reliably and uniformly heat shrinkable tubing can be obtained, and that in the range between 50 and 100% expansion the yield is lower.

While an important aspect of the present invention is the production of heat shrinkable FEP-hydrocarbon tubing of greater heat shrinkage, the invention is also applicable to production of heat shrinkage tubing of small expansion ratios, in the range between 1.05:1 and 1.21:1, which is suitable for coverings like scuff jackets, hose coverings, wire and cable coverings and roll coverings.

In accordance with the invention the FEP-fluorocarbon tubing is heat sealable since it has not been irradiated and there is no need to irradiate it.

One of the great advantages of FEP-fluorocarbon heat shrinkable tubing is that it has properties comparable to tetrafluoroethylene such as fire resistance, chemical resistance, high electrical insulation and ability to withstand high temperature (FEP-fluorocarbon can continuously withstand a temperature of 400° F.) but it has additional properties such as transparency and heat shrinkability at lower temperatures than tetrafluoroethylene. Where tetrafluoroethylene would normally be heat shrunk at temperatures of 625° F. or above, and would damage or destroy some materials which might to advantage be in contact with it, FEP-fluorocarbon tubing of the present invention can be heat shrunk at temperatures in the range from 250 to 400° F., and especially when heat shrunk at these lower temperatures can be safely heat shrunk against wood, other plastics and rubber.

We find that the minimum practical wall thickness of tubing which can be produced according to the invention is about 0.005 inch. When tubing thicker than 0.060 inch is produced according to the present invention, the combination of temperature and pressure causes holes to blow in the tubing instead of expanding the tubing.

The invention has been successfully applied to produce indefinite lengths of FEP-fluorocarbon tubing, of the order, for example, of 300 feet or more in a single piece.

In order to produce FEP-fluorocarbon tubing which is susceptible of expansion and heat shrinking in accordance with the present invention it is necessary that the FEP-fluorocarbon be melt extruded under special techniques.

At FIGURE 1 we show a typical extrusion die for melt extruding FEP-fluorocarbon tubing. This shows a die 20 surrounding a mandrel 21. Between the two and out through an extrusion nozzle 22 are forced FEP-fluorocarbon plastic 23 under a suitable pressure as from an extrusion screw not shown. Following current practice, the extruded tubing leaving the extrusion nozzle at 22 is drawn down at 24 to form the final FEP-fluorocarbon tubing 25. The mandrel 21 suitable has an opening 26 for blowing air through the tubing as well known in the art.

We find that in order to make FEP-fluorocarbon tubing which can be reliably expanded and expanded to a considerably higher degree, two changes must be made in the prior practice. The barrel temperatures as set forth above must be lowered by 20° to 30° F. The front barrel temperature in the practice as carried out by us is approximately 540 to 550° F. and the rear barrel temperature is 530 to 540° F. irrespective of tubing size.

Also in the practice as carried out by us the extrusion rate depending on extruder size and tubing size is within the following ranges.

| Screw diameter in inches: | Extrusion rate in pounds per hour |
|---|---|
| 1 | 1.75–2 |
| 2 | 4.9–5.6 |
| 3 | 14–16 |

If the reduced temperature range and reduced extrusion rate be employed as set forth above, a marked benefit is obtained and FEP-fluorocarbon tubing is obtained which can be propertly expanded at the temperature ranges set forth below to obtain the advantages already described.

In the present practice of melt extruding FEP-fluorocarbon the front barrel temperature is maintained at about 570° F. and the rear barrel temperature at about 560° F., regardless of the tubing size.

Also in the current practice of melt extruding FEP-fluorocarbon the extrusion rate for the size of extruded tubing in the table above is as follows.

| Screw diameter in inches: | Extrusion rate in pounds per hour |
|---|---|
| 1 | 2.5 |
| 2 | 7 |
| 3 | 20 |

Thus the throughput is about 20% lower when making the heat shrinkable FEP-fluorocarbon tubing of the present invention.

FEP-fluorocarbon tubing extruded at the barrel temperature set forth above and at the rates set forth above which accord with normal practice, cannot be expanded by heating and applying gas internally because an air hole blows through it or is expandable only about 15 or 20% of the initial internal diameter.

In order to expand the FEP-fluorocarbon tubing in accordance with the invention, the tube, after completion of the extrusion and cooling, is heated to a temperature of 250 to 400° F. and preferably 325 to 350° F. This can be accomplished in a suitable oven, by infra-red heat, hot air heating or by heating in a hot liquid.

Figure 2:
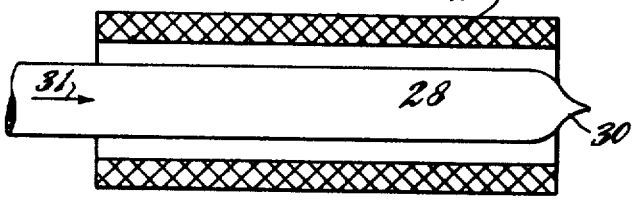
FIGURE 2 is a diagrammatic axial section showing the heating of tubing according to the invention for the purpose of expansion.

We show in FIGURE 2 a suitable electric heater or oven 27, which may be for example an electric resistance heater, surrounding a tube 28 of FEP-fluorocarbon which is closed at one end 30 as by heat sealing as shown in FIGURE 2, or by a plug or otherwise.

Figure 3:
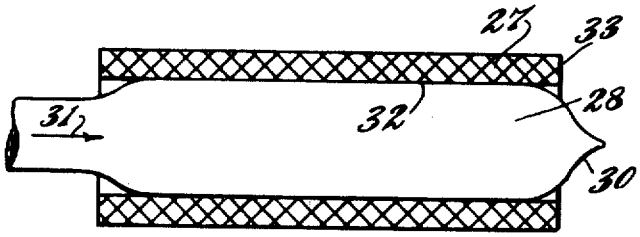
FIGURE 3 is a diagrammatic axial section showing the expansion of the tubing according to the invention.

Once the tube 28 reaches the desired temperature for expansion within the range as set forth above, it is subjected to gas, liquid or mechanical pressure applied internally as indicated by arrow 31. In the case of gas pressure, compressed air, nitrogen, carbon dioxide or the like are used. The result is as shown in FIGURE 3 an expanded tube of larger diameter as shown at 32. The liquid can be oil or liquid metal. The pressure can be applied mechanically by expanding mandrels of well known construction.

It is entirely optional whether there be a mandrel surrounding the tube. In FIGURE 3 the heater wall, being cylindrical, forms a mandrel at 33 which can be used to limit the expansion if desired.

The gas pressure used in a function of the diameter of the tube to be expanded, the thickness of its wall and the temperature of the tube when it is expanded.

Typical relations are as follows: in expanding FEP-fluorocarbon tubing having an internal diameter of 1/32" and a wall thickness of 0.006" at a temperature of 325° F. we find that an internal air pressure of 100 p.s.i. gives an expansion of 33% measured on the intial internal diameter.

With FEP-fluorocarbon tubing having internal diameter of ½" and a wall thickness of 0.020" at a temperature of 325° F. we find that 40 p.s.i. of air pressure gives an expansion of 45%.

With FEP-fluorocarbon tubing having an internal diameter of 1" and a wall thickness of 0.020" heated to a temperature of 325° F. an expansion of 33% is obtained by an air pressure of 15 p.s.i.

Figure 4:
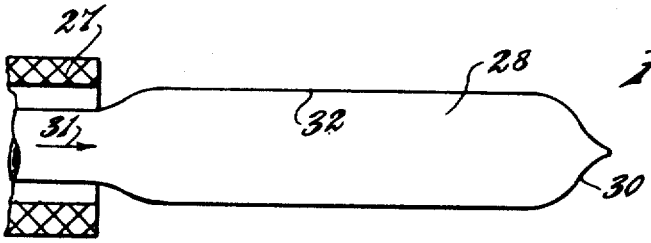
FIGURE 4 is a diagrammatic axial section showing the cooling of the expanded tubing according to the invention.

Once the expansion desired has been obtained, it is then important to cool the tube while it is expanded so that it will become heat shrinkable by retaining the memory of its smaller diameter. In FIGURE 4 we show the tube 28 moved out of the oven to cool it while still subjected to the internal pressure.

It will be understood of course that if the tube is being progressed forward continuously subjected to the internal pressure, from the position of FIGURE 2 to the position of FIGURE 4, the expansion will be obtained progressively and long lengths of heat shrinkable tubing as shown in FIGURE 4 can be obtained, say several hundred feet long.

The heat shrinkable FEP-fluorocarbon tubing illustrated in FIGURE 4 is unusual in its properties. Depending on the extent of expansion it will give a corresponding high degree of contraction when heated to a temperature in the range from 200 to 400° F. and preferably 325 to 350° F. No harm is done to the plastic as it can be exposed indefinitely to a temperature of 400° F.

The contraction or shrinkage is uniform and unlike some of the products in the prior art does not involve shrivelling of the tubing so that there is not any appreciable rejection rate from improperly heat shrunk tubing.

The heat shrunk tubing has not been irradiated and remains heat sealable.

While the knowledge at the present time of the theory is not large, we postulate that under the conditions produced by melt extrusion and expansion according to the invention, the fluorine atom being relatively small compared to other hydrogen substituted atoms, produces a sheath whose cohesive energy density to adjoining molecular chains is relatively great. Thus, crystallites are formed which resemble those of TFE-fluorocarbon resin and the tubing has a greater elastic memory which can be effectively employed. The lower extrusion temperature and rates preserve the crystallites rather than breaking them up so that more of the elastic memory inherent in FEP-fluorocarbon resin can be used to make the heat shrinkable form of tubing.

Like the FEP-fluorocarbon tubing prior to expansion, the tube when heat shrinkable and also after heat shrinking is transparent, permitting inspection of wiring, and the like, is highly fire resistant, has a high resistance to chemical attack, and excellent electrical insulating properties. It will stand temperatures of 400° F. indefinitely and stand higher temperatures for short times.

It has a low coefficient of friction and is relatively slippery when contacting other surfaces.

Figure 6:
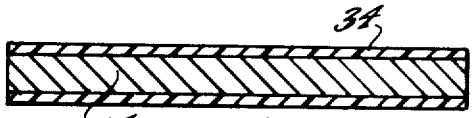
FIGURE 6 is an axial section showing the tubing of the invention shrunk on an interior object.
Figure 5:
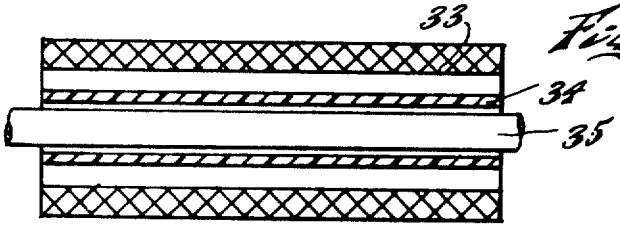
FIGURE 5 is a diagrammatic axial section showing the heating of the tubing of the invention for the purpose of shrinkage.

The heat shrinkage is illustrated in FIGURES 5 and 6. FIGURE 5 shows a suitable oven 33. The heat shrinkable tube 34 according to the invention is placed in this oven surrounding a core material 35 on which it is desired to have the tube 34 tightly shrink. In the oven 33 the tube 34 is heated to a temperature in the range of 200 to 400° F. and preferably 325 to 350° F. and as shown in FIGURE 6 it shrinks on and tightly engages the core material 35.

It will be evident that there are many uses for which this tubing may be employed. Thus if the core material is an electrical wire, wiring harness or cable, the heat shrunk FEP-fluorocarbon tube 34 can serve as an outer jacket or protection. If the core material 35 is an internal metallic tube such as a copper tube or a stainless steel tube, the FEP-fluorocarbon exterior tube may serve to protect it against corrosion as in electroplating tanks, chemical solutions, pharmaceutical reaction mixtures, and the like, and can prevent deposits and encrustation because of the slippery character of the FEP-fluorocarbon. The heat transfer of such a composite tube of copper and FEP-fluorocarbon can be better than that of glass and the film coefficient of the FEP-fluorocarbon in viscous solutions is better than that of glass.

This composite tube can be produced in adequate lengths of 50 to 300 feet or more. The FEP-fluorocarbon is much less fragile than glass.

The heat shrinkable FEP tubing lends itself to producing electrical insulation on connectors, terminals, plugs and the like. It also produces very effective moisture barriers.

The heat shrinkable FEP-fluorocarbon tubing of the invention can be used to produce corrosion resistant coverings on rolls, shafts, and other components which may be subjected to chemical attack.

In view of our invention and disclosure variations and modifications to meet individual whim or particular need will doubtless become evident to others skilled in the art to obtain all or part of the benefits of our invention without copying the composition shown, and we therefore claim all such insofar as they fall within the reasonable spirit and scope of our claims.

Having thus described our invention what we claim as new and desire to secure by Letters Patent is:

1. Heat shrinkable tubing of a copolymer of tetrafluoroethylene and 5 to 35% by weight of hexafluoropropylene, whose ratio of expanded diameter to recovered diameter varies from 1.21 to 2.0 and retaining the property of heat sealability.

2. Heat shrinkable tubing of a copolymer of tetrafluoroethylene and 5 to 35% by weight of hexafluoropropylene, whose ratio of expanded diameter to recovered diameter varies between 1.05 and 1.21, and retaining the property of heat sealability.

3. Heat shrinkable tubing of a copolymer of tetrafluoroethylene and 5 to 35% by weight of hexafluoropropylene, whose ratio of expanded diameter to recovered diameter varies between 1.05 and 2.0, said tubing being in continuous lengths of ten feet, or greater.

4. Heat shrinkable tubing of a copolymer of tetrafluoroethylene and 5 to 35% by weight of hexafluoropropylene, whose ratio of expanded diameter to recovered diameter varies from 1.05 to 2.0, having a wall thickness of between 0.005 and 0.060 inch.

*5. Heat shrinkable tubing of a copolymer of tetrafluoroethylene and 5 to 35% by weight of hexafluoropropylene, whose ratio of expanded diameter to recovered diameter is within the range from 1.33 to 2.0 and retaining the property of heat sealability.*

*6. Heat shrinkable tubing as in claim 5 wherein the amount of hexafluoropropylene is from 5 to 15% by weight.*

*7. Heat shrinkable tubing of a copolymer of tetrafluoroethylene and 5 to 35% by weight of hexafluoropropylene, whose ratio of expanded diameter to recovered diameter is within the range from 1.33 to 1.5 and retaining the property of heat sealability.*

*8. Heat shrinkable tubing of a copolymer of tetrafluoroethylene and 5 to 35% by weight of hexafluoropropylene, whose ratio of expanded diameter to recovered diameter is within the range from 1.33 to 2.0, said tubing being in continuous lengths of fifty feet, or greater.*

*9. Heat shrinkable tubing as in claim 8 wherein the ratio is from 1.33 to 1.5.*

*10. Heat shrinkable tubing of a copolymer of tetrafluoroethylene and 5 to 35% by weight of hexafluoropropylene, whose ratio of expanded diameter to recovered diameter is within the range from 1.33 to 2.0, having a wall thickness of between 0.006 and 0.020 inch.*

*11. Heat shrinkable tubing as in claim 10 wherein the ratio is from 1.33 to 1.5.*

References Cited

UNITED STATES PATENTS

The following references, cited by the Examiner, are of record in the patented file of this patent or the original patent.

| | | | |
|---|---|---|---|
| 2,888,042 | 5/1959 | St. John et al. | 156—306X |
| 2,964,796 | 12/1960 | Press | 138—118X |
| 3,008,187 | 11/1961 | Slade | 264—127 |
| 3,050,786 | 8/1962 | St. John et al. | 138—143X |

OTHER REFERENCES

"Teflon" (tetrafluoroethylene) Resin, Extrusion of Thin-Wall Tubing, Polychemical Dept., E. I. du Pont de Nemours and Co. (Inc.), Wilmington 98, Del., 12 pp., published January 1957.

"Foaming FEP for Wire Insulation," by Stuart K. Randa, E. I. du Pont de Nemours, Inc., 3 pp., reprint from Plastic Technology, 1964, by Plastic Technology Magazine.

"Teflon 100," FEP (Fluorocarbon Resin, Melt Processible Resin) Polychemical Dept., E. I. du Pont de Nemours and Co. (Inc.), Wilmington 98, Del., 16 pp., published July 1964.

"Teflon" 100, 110, 120 (FEP-fluorocarbon Resins, Melt Processible Resins and Aqueous Dispersion), Polychemical Dept., E. I. du Pont de Nemours, Inc., Wilmington 98, Del., 6 pp., published July 1964.

LAVERNE D. GEIGER, Primary Examiner

H. K. ARTIS, Assistant Examiner

U.S. Cl. X.R.

18—1, 14; 117—232; 138—143; 264—95, 127